United States Patent
Saiki (10) Patent No.: US 11,199,451 B2
(45) Date of Patent: Dec. 14, 2021

(54) SKIN COLOR MEASUREMENT APPARATUS AND COMPUTER-READABLE STORAGE MEDIUM

(71) Applicant: CANON KABUSHIKI KAISHA, Tokyo (JP)

(72) Inventor: Tomoyuki Saiki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/808,970

(22) Filed: Mar. 4, 2020

(65) Prior Publication Data
US 2020/0300705 A1 Sep. 24, 2020

(30) Foreign Application Priority Data
Mar. 20, 2019 (JP) .............................. JP2019-053477

(51) Int. Cl.
*G01J 3/50* (2006.01)
*G01J 3/02* (2006.01)
*G01J 3/46* (2006.01)

(52) U.S. Cl.
CPC .............. *G01J 3/50* (2013.01); *G01J 3/0205* (2013.01); *G01J 2003/467* (2013.01)

(58) Field of Classification Search
None
See application file for complete search history.

(56) References Cited

U.S. PATENT DOCUMENTS 9,513,165 B2 * 12/2016 Ishimaru .............. G01J 3/4532
9,714,900 B2 * 7/2017 Haider .................. A61B 5/0075
2006/0094941 A1 * 5/2006 Cho ....................... A61B 5/1455 600/316
2010/0105994 A1 * 4/2010 Onoe .................. A61B 5/02444 600/310
2013/0094040 A1 * 4/2013 Tomii ................. H04N 1/00034 358/1.9
2014/0058224 A1 * 2/2014 Gellermann ........... G01N 21/65 600/314
2014/0058227 A1 * 2/2014 Yamanaka ............. G01N 21/64 600/316
2014/0378779 A1 * 12/2014 Freeman .............. A61B 5/1032 600/301
2015/0070694 A1 * 3/2015 Fan .......................... G01J 3/50 356/319

(Continued)

FOREIGN PATENT DOCUMENTS

| JP | 3815903 B2 | 8/2006 |
| JP | 2013-192651 | 9/2013 |
| JP | 2018-504946 | 2/2018 |

*Primary Examiner* — Shawn Decenzo
(74) *Attorney, Agent, or Firm* — Venable LLP (57) ABSTRACT

A measurement apparatus includes: a light source configured to irradiate a measurement region of skin whose color is to be measured with light; a light receiving unit configured to receive reflected light from the measurement region or transmitted light that has passed through the measurement region; a calculation unit configured to repeatedly obtain determination information and color information relating to the color of the measurement region, based on a light-receiving result of the light receiving unit; and a selection unit configured to select a measurement result of a color of the skin from the repeatedly-obtained color information, based on a temporal change in the determination information.

27 Claims, 8 Drawing Sheets

(56) References Cited

U.S. PATENT DOCUMENTS

2016/0166150 A1\* 6/2016 Vilenskii .............. H04N 5/2254
                                                          348/77
2018/0271382 A1\* 9/2018 Bezemer .............. A61B 5/6803
2019/0239761 A1\* 8/2019 Tao ...................... A61B 5/0077

\* cited by examiner

CALIBRATION IS IN PROGRESS.
PLEASE WAIT FOR A WHILE.

FIG. 8B

CALIBRATION IS FAILED.
PLEASE PUT APPARATUS IN CASE.

FIG. 8C

CALIBRATION IS SUCCESSFUL.
PLEASE START MEASUREMENT.

FIG. 8D

MEASUREMENT IS IN PROGRESS

FIG. 8E

MEASUREMENT IS IN PROGRESS.
PLEASE MEASURE RIGHT CHEEK.

FIG. 8F

MEASUREMENT FAILED.
PLEASE MEASURE AGAIN.

FIG. 8G

MEASUREMENT IS COMPLETE.
PLEASE RETURN APPARATUS
TO CASE.

SKIN COLOR MEASUREMENT APPARATUS AND COMPUTER-READABLE STORAGE MEDIUM

BACKGROUND OF THE INVENTION

Field of the Invention

The present invention relates to a skin color measurement technique.

Description of the Related Art

Japanese Patent No. 3815903 discloses a configuration for measuring skin color using a colorimeter. According to Japanese Patent No. 3815903, skin is prevented from being excessively pressed by using a small, lightweight colorimeter, and thus, a situation is prevented where blood flow stagnates and skin color changes as a result of performing the measurement. Japanese Patent No. 3815903 also discloses a configuration in which a pressure force sensor is attached to the colorimeter as needed.

However, skin color cannot be accurately measured while suppressing a change in skin color due to the skin being pressed, only by using a small, lightweight colorimeter. In addition, if a pressure force sensor is attached, the configuration of the measurement apparatus becomes complex, and the cost of the measurement apparatus increases.

SUMMARY OF THE INVENTION

According to an aspect of the present invention, a measurement apparatus includes: a light source configured to irradiate a measurement region of skin whose color is to be measured with light; a light receiving unit configured to receive reflected light from the measurement region or transmitted light that has passed through the measurement region; a calculation unit configured to repeatedly obtain determination information and color information relating to the color of the measurement region, based on a light-receiving result of the light receiving unit; and a selection unit configured to select a measurement result of a color of the skin from the repeatedly-obtained color information, based on a temporal change in the determination information.

Further features of the present invention will become apparent from the following description of exemplary embodiments with reference to the attached drawings.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

Figure 1:
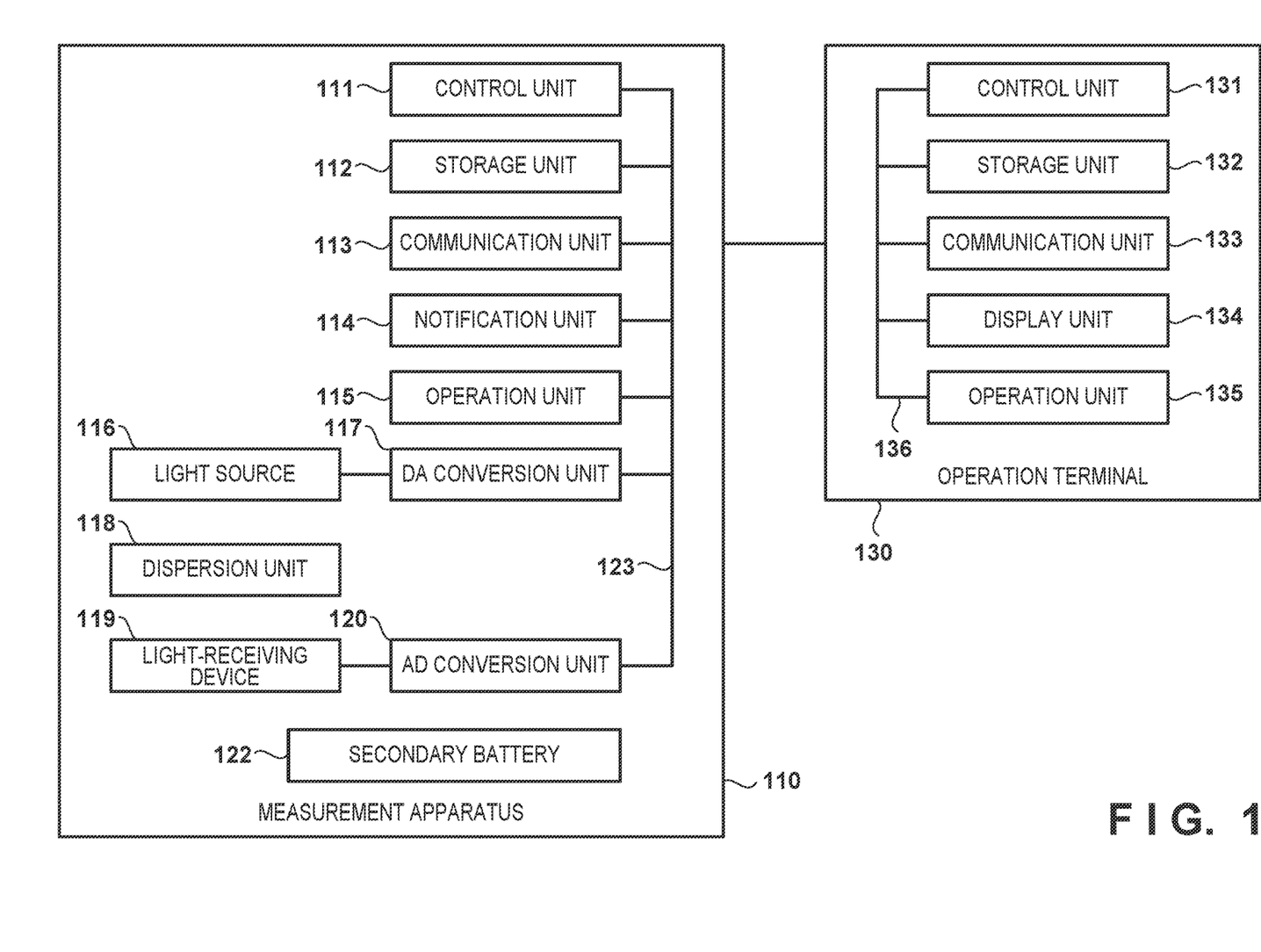
FIG. 1 is a configuration diagram of a measurement system according to an embodiment.

FIG. 1 is a configuration diagram of a measurement system according to an embodiment. The measurement system includes a measurement apparatus 110 and an operation terminal 130 that communicates with the measurement apparatus 110 in a wired or wireless manner. A control unit 111 of the measurement apparatus 110 has a CPU and controls the entire measurement apparatus 110. A storage unit 112 is a ROM or a RAM, and the control unit 111 executes a control program stored in the storage unit 112 to control the measurement apparatus 110. Pieces of data used by the control unit 111 to perform control and pieces of data that are to be temporarily stored are also stored in the storage unit 112. A communication unit 113 communicates with the operation terminal 130 in a wired or wireless manner. A notification unit 114 is a device, such as an LED or a buzzer, for notifying a user of the operational state of the measurement apparatus 110. An operation unit 115 is a device, such as a push switch, that can be operated by the user of the measurement apparatus 110.

A light source 116 is a white LED and emits light at an intensity that corresponds to a voltage output by a DA (digital-analog) conversion unit 117. A dispersion unit 118, which is a prism, a diffraction grating, or the like, disperses received light according to wavelength and outputs the received light as wavelength-dispersed light. A light-receiving device 119 is, for example, a line sensor that has a plurality of pixels, and each of the pixels receives light with a predetermined wavelength, of the wavelength-dispersed light output by the dispersion unit 118, and outputs a voltage corresponding to the amount of received light. For example, the measurement apparatus 110 is configured such that each of the pixels in the light-receiving device 119 receives light with a wavelength band of 10 nm. Note that the dispersion unit 118 and the light-receiving device 119 constitute a spectrocolorimeter (spectral sensor). Alternatively, the light source 116, the dispersion unit 118, and the light-receiving device 119 constitute a spectrocolorimeter. An AD (analog-digital) conversion unit 120 converts voltages that respectively indicate the amount of light received by each of the pixels output by the light-receiving device 119 to a digital value. The aforementioned functional blocks of the measurement apparatus 110 are connected to each other by a bus 123 and can communicate with each other. A secondary battery 122 is a power source for driving the measurement apparatus 110, and may be a lithium-ion battery, for example. Note that, if the measurement apparatus 110 and the operation terminal 130 are connected to each other in a wired manner, a configuration in which the operation terminal 130 supplies operational power for the measurement apparatus 110 may also be employed. In this case, the secondary battery 122 can be omitted.

A control unit 131 of the operation terminal 130 has a CPU and controls the entire operation terminal 130. A storage unit 132 is a ROM or a RAM, and the control unit 131 executes a control program stored in the storage unit 132 to control the operation terminal 130. Pieces of data used by the control unit 131 to perform control and pieces of data that are to be temporarily stored are also stored in the storage unit 132. A communication unit 133 communicates with the measurement apparatus 110 in a wired or wireless manner. A display unit 134 is a display device, and displays the state of the measurement apparatus 110, the measurement results, and the like. An operation unit 135 is a keyboard, a mouse, a touch panel display, or the like, and the user operates the operation terminal 130 via the operation unit 135. The functional blocks of the operation terminal 130 are connected to each other via a bus 136, and can communicate with each other. The operation terminal 130 may be a dedicated device, or may be constituted by a device such as a PC, a tablet, or smartphone.

Figure 2A:
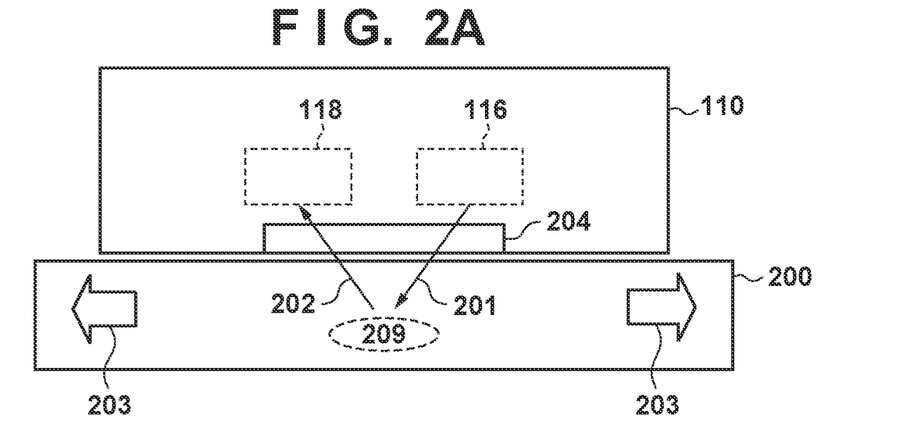
FIGS. 2A and 2B show different modes of a measurement apparatus.
Figure 2B:
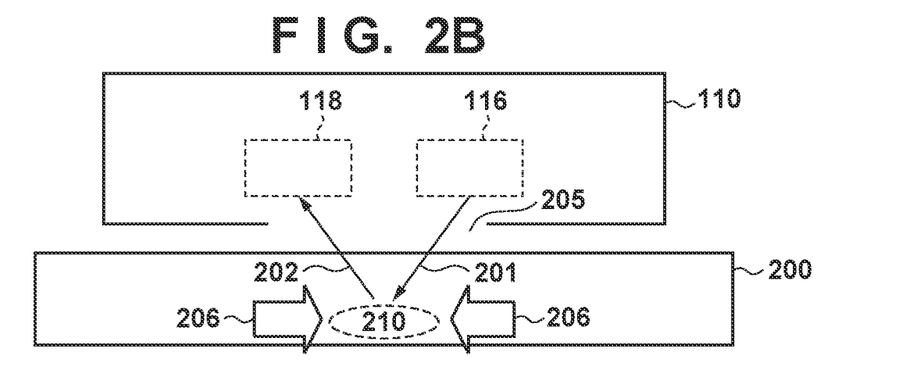

FIGS. 2A and 2B show different modes of the measurement apparatus 110. A housing of the measurement apparatus 110 in FIG. 2A is provided with an acrylic plate 204, which is a transparent member (a light transmissive member). A light beam 201 emitted by the light source 116 in the housing passes through the acrylic plate 204 and irradiates a measurement region 209 of skin 200. A reflected light beam 202 from the measurement region 209 passes through the acrylic plate 204 and is incident on the dispersion unit 118 in the housing. On the other hand, the housing of the measurement apparatus 110 in FIG. 2B is provided with an opening 205 corresponding to a measurement region 210. A light beam 201 emitted by the light source 116 in the housing passes through the opening 205 and irradiates the measurement region 210 of the skin 200. A reflected light beam 202 from the measurement region 210 passes through the opening 205 and is incident on the dispersion unit 118 in the housing.

Figure 3:
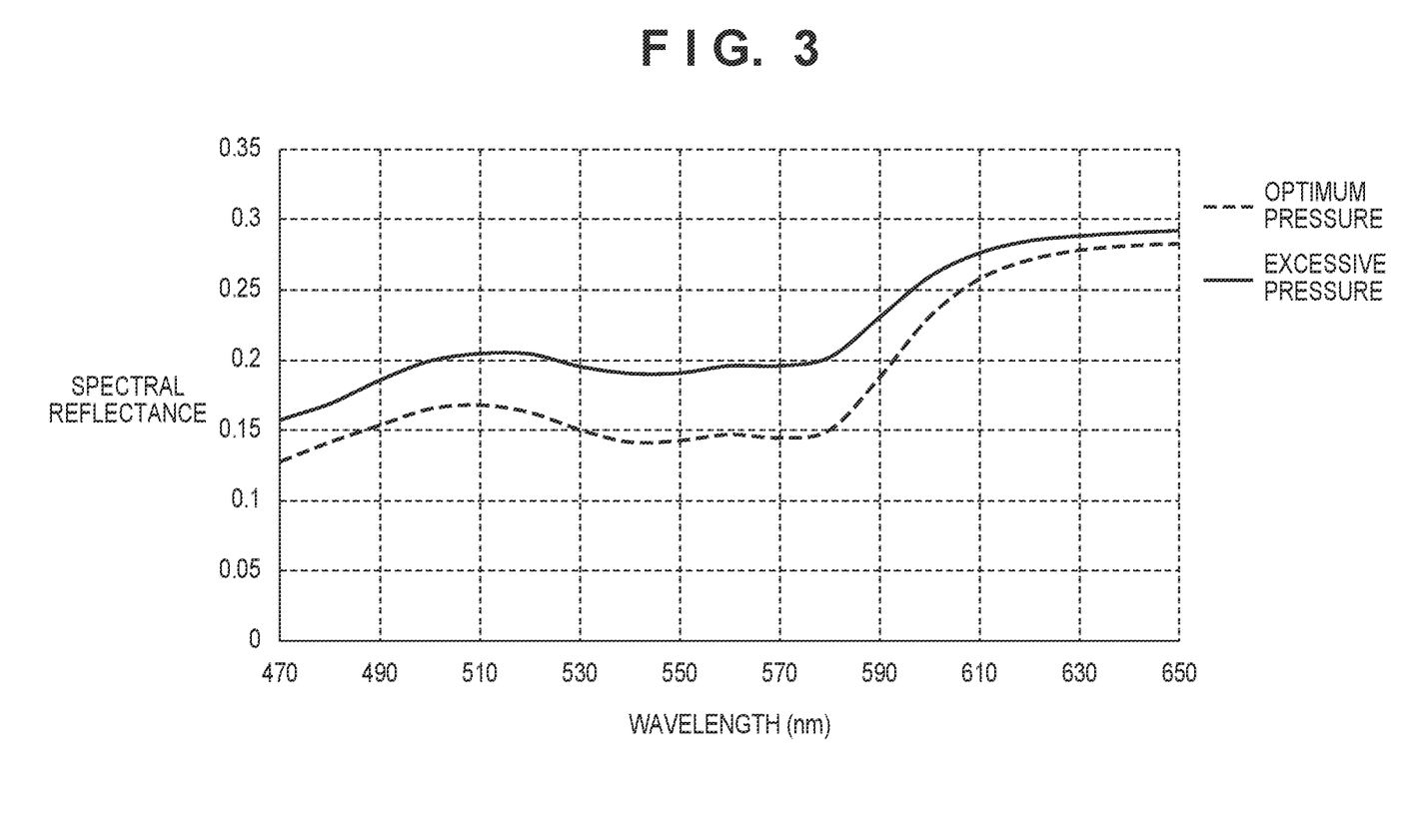
FIG. 3 shows an example of the results of measuring spectral reflectance of skin.

In both modes, the measurement apparatus 110 is brought into contact with the skin 200 when measurement is performed. In the case of the measurement apparatus 110 that is provided with the acrylic plate 204, the acrylic plate 204 is brought into contact with the measurement region 209 of the skin 200. Upon the acrylic plate 204 pressing the skin 200, blood flow of the human body stagnates, and blood moves away from the measurement region 209, as indicated by reference numeral 203 in FIG. 2A. For this reason, the color of the measurement region 209 becomes paler or white. On the other hand, in the case of the measurement apparatus 110 that is provided with the opening 205, a portion of the housing around the opening 205 is brought into contact with the periphery of the measurement region 210 of the skin 200. Upon the portion of the housing around the opening 205 pressing the skin 200, blood moves toward the measurement region 210 that is not pressed, as indicated by reference numeral 206 in FIG. 2B. For this reason, the color of the measurement region 210 becomes darker or red. Thus, in both modes, the color of the measurement region of the skin 200 changes during measurement from the color of that in the state where the measurement apparatus 110 is not in contact with the skin 200. FIG. 3 shows an example of the results of measuring the spectral reflectance of the skin 200. A dotted line in FIG. 3 indicates the spectral reflectance measured with an appropriate pressure force, and a solid line indicates the spectral reflectance measured in a state where the pressure force applied by the acrylic plate 204 is excessive and the skin color has become paler or white.

Figure 4:
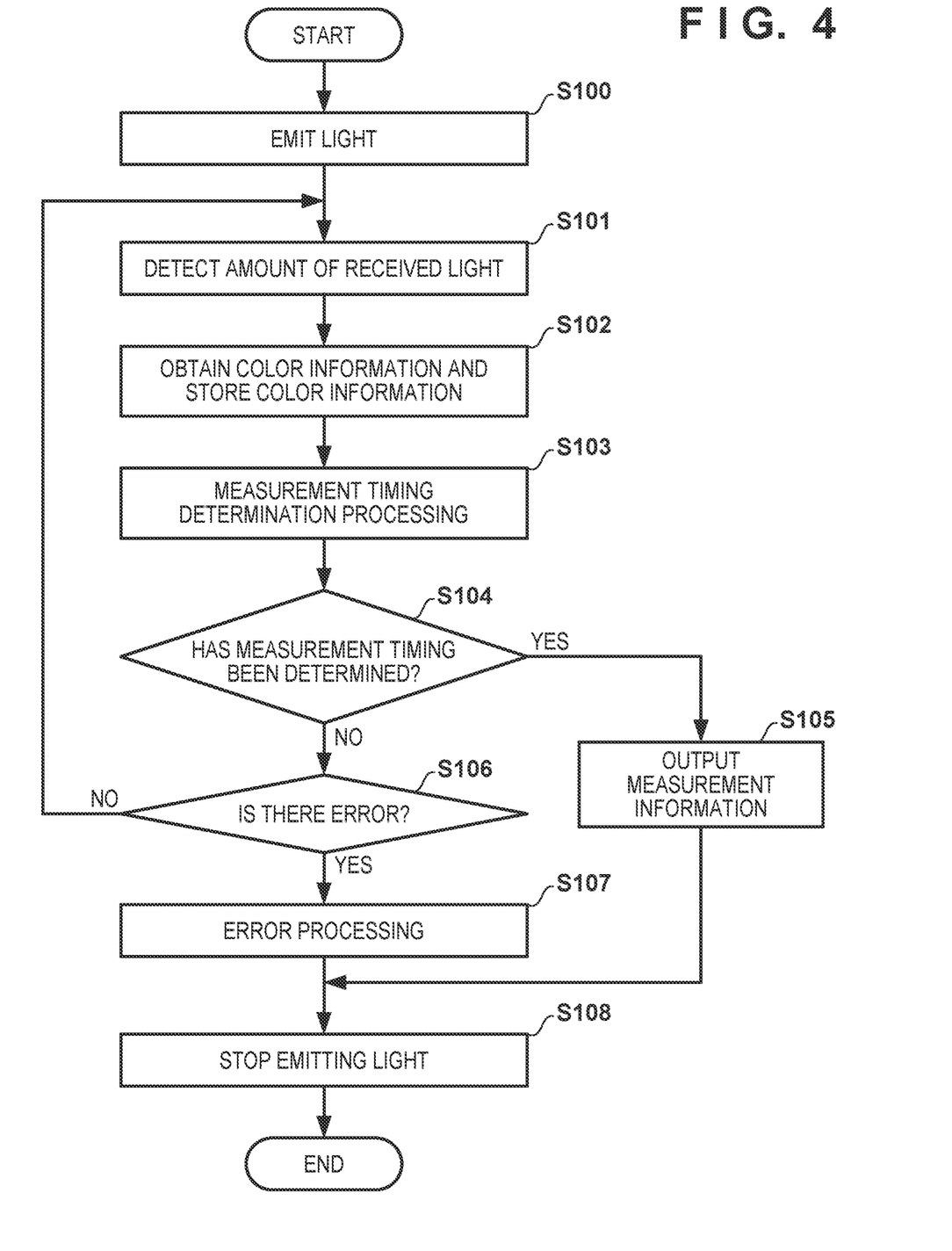
FIG. 4 is a flowchart of skin color measurement processing according to an embodiment.

FIG. 4 is a flowchart of skin color measurement processing performed by the measurement system according to this embodiment. Note that, in this embodiment, the measurement apparatus 110 is provided with the acrylic plate 204 shown in FIG. 2A. Processing shown in FIG. 4 is started by an operator of the measurement system operating the operation unit 115 or 135 and instructing the measurement apparatus 110 to start measurement. Once measurement has been started, for example, the operator or a person to undergo measurement brings the acrylic plate 204 of the measurement apparatus 110 into contact with the measurement region 209 of the skin 200 of the person to undergo measurement, in accordance with a notification made by the notification unit 114 or content displayed on the display unit 134. Although, in the following description, the operator of the measurement system differs from the person to undergo measurement, namely the person whose skin color is to be measured, the operator and the person to undergo measurement may be the same person. Also, the operator and the person to undergo measurement will be collectively expressed as a user.

Upon receiving the instruction to start measurement, in step S100, the control unit 111 of the measurement apparatus 110 causes the light source 116 to emit light at a measurement intensity. Next, in step S101, the control unit 111 acquires, from the AD conversion unit 120, the amount of light with respective wavelengths received by the light-receiving device 119. In step S102, the control unit 111 obtains the spectral reflectance at the respective wavelengths based on the amount of received light with the respective wavelengths, and also calculates and obtains color information, such as color values of the lightness $L^*$, the chromaticity $a^*$, and the chromaticity $b^*$ in an $L^*a^*b^*$ color space, for example, based on the spectral reflectance at the respective wavelengths. The control unit 111 stores the obtained color information in the storage unit 112.

Then, in step S103, the control unit 111 performs later-described measurement timing determination processing. Next, in step S104, the control unit 111 determines whether or not the measurement timing has been determined. If the measurement timing has been determined, the control unit 111 advances the processing to step S105. On the other hand, if the measurement timing has not been determined, the control unit 111 advances the processing to step S106. In step S105, the control unit 111 selects color information measured at the determined measurement timing, of the color information stored in the storage unit 112. The selected color information is read out from the storage unit 112 and is output, as measurement information indicating the result of skin color measurement, to the operation terminal 130. Next, in step S108, the control unit 111 causes the light source 116 to stop emitting light, and ends the processing in FIG. 4.

On the other hand, in step S106, the control unit 111 performs error determination. For example, if the measurement timing has not been determined, even if a predetermined period of time has elapsed from when light emission was started in step S100, the control unit 111 can determine that a time-out error has occurred. It can also be determined that an error has occurred if the amount of received light with the respective wavelengths detected in step S101 repeatedly deviates from a normal range a predetermined number of times. If it is determined in step S106 that an error has occurred, the control unit 111 advances the processing to step S107. On the other hand, if it is determined in step S106 that no error has occurred, the control unit 111 repeats the processing from step S101. In step S107, the control unit 111 outputs error information indicating the content of the determined error to the operation terminal 130, and in step S108, the control unit 111 causes the light source 116 to stop emitting light, and ends the processing in FIG. 4.

Figure 5A:
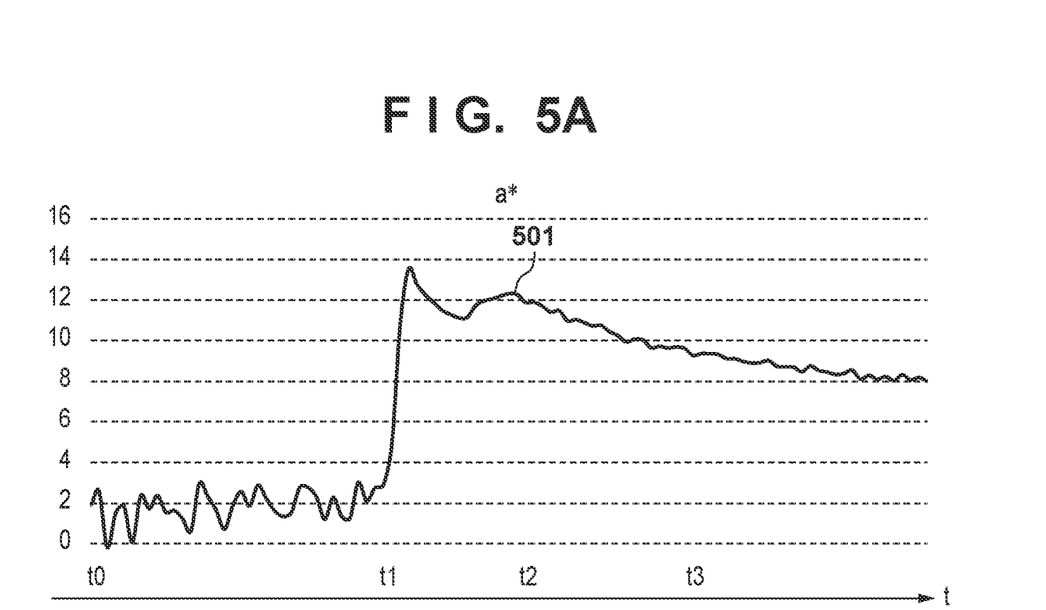
FIGS. 5A and 5B are diagrams illustrating measurement timing determination processing according to an embodiment.
Figure 5B:
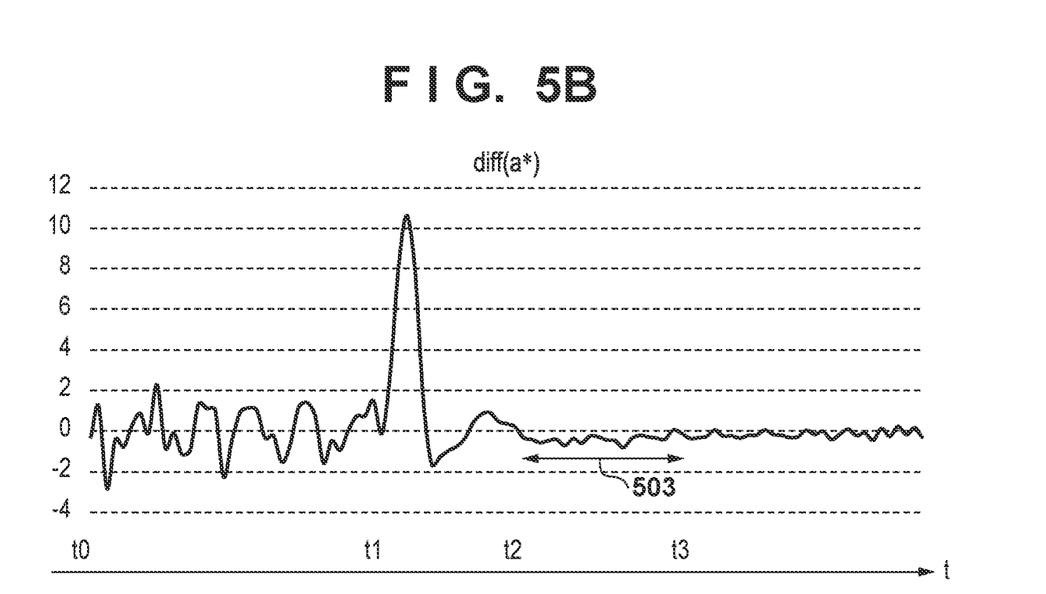

FIGS. 5A and 5B are diagrams illustrating the measurement timing determination processing in step S103 in FIG.

4. FIG. 5A shows a temporal change in the value of the chromaticity a* in the color information acquired each time step S102 is carried out during repetitive processing of the steps from step S101 to step S106. Note that a time t0 in FIGS. 5A and 5B is a time (S100) at which the measurement processing starts. A time t1 is a timing at which the measurement apparatus 110 is brought into contact with the skin 200 of the person to undergo measurement. As a result of the acrylic plate 204 of the measurement apparatus 110 being brought into contact with the skin 200, the chromaticity a* significantly changes in the period from the time t1 to a time t2. From the time t2, the chromaticity *a decreases exponentially. The change in the chromaticity a* from the time t2 derives from the fact that blood moves away from the measurement region 209, as described using FIG. 2A.

The period before the time t2 in FIG. 5A includes a period during which the skin 200 is not measured and a period during which the measured value significantly changes due to the acrylic plate 204 being brought into contact with the skin 200. Accordingly, the color information acquired in step S102 before the time t2 does not appropriately represent the color of the skin 200. The period after the time t2 is a period during which the color of the skin 200 becomes paler or white due to the movement of blood. Accordingly, the color information acquired in step S102 after the time t2 does not appropriately represent the color of the skin 200. Therefore, the color information acquired at the time t2 denoted by reference numeral 501 in FIG. 5A most appropriately represents the color of the skin 200. The measurement timing determination processing performed in step S103 in FIG. 4 is processing in which the timing of the time t2 at which the chromaticity a*, which is determination information, begins to decrease exponentially is determined using the chromaticity a* as the determination information. How to determine the measurement timing based on the determination information will be described below.

First, the control unit 111 obtains a difference value diff(a*) by subtracting a chromaticity a*(t−3) acquired at a time (t−3) from a chromaticity a*(t) acquired at a time t, for example. Note that the time (t−3) means the third round prior to a round of the repetition of the steps from step S101 to step S106 in FIG. 4. That is to say, given that the chromaticity a* obtained in step S102 in a certain round is denoted as a*(t), the chromaticity a* obtained in step S102 in the third round prior to that round is denoted as the chromaticity a*(t−3). FIG. 5B shows a temporal change in diff(a*). As shown in FIG. 5B, diff(a*) continues to take a negative value in a period 503 during which the chromaticity a* decreases exponentially. The control unit 111 searches for a time zone during which diff(a*) continues to take a negative value for a predetermined period or more, and determines the start time of a time zone found as a result of the search, as the measurement timing. The control unit 111 then notifies the operation terminal 130 of color information acquired at the determined measurement timing, of the color information acquired in step S102 in the respective rounds stored in the storage unit 112.

The determination information and the color information are repeatedly acquired as described above, and are stored in the storage unit 112. Note that, in this embodiment, the determination information is the color value of the chromaticity a*, and the color information is the color values of the lightness L*, the chromaticity a*, and the chromaticity b*. Thus, in this embodiment, the determination information is information that is a part of the color information. The control unit 111 retrospectively determines the most appropriate measurement timing, based on the temporal change in the repeatedly-acquired determination information. Then, the color information acquired at the determined measurement timing is used as the measurement information indicating the result of measuring the color of the skin 200. With this configuration, accurate measurement results can be presented to a user while suppressing the influence of a change in the color of the skin 200 due to the measurement apparatus 110 pressing the skin 200. In addition, there is no need for attaching a pressure force sensor, which makes the configuration of the measurement apparatus 110 complex and increases the cost.

Second Embodiment

Figure 6A:
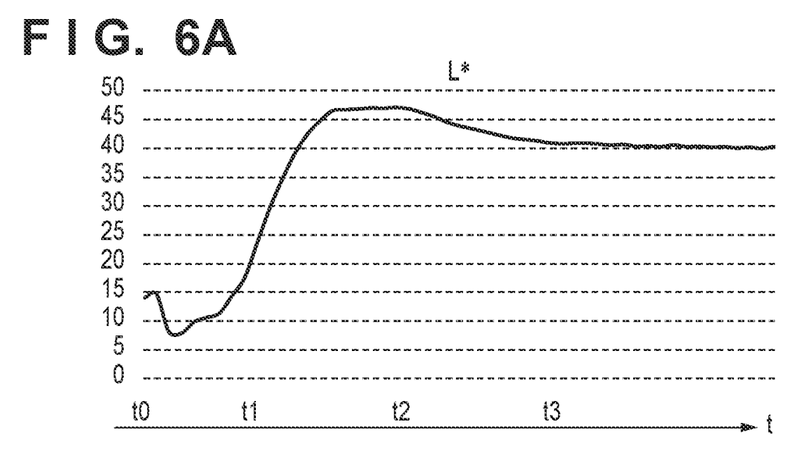
FIGS. 6A to 6C are diagrams of measurement timing determination processing according to an embodiment.
Figure 6B:
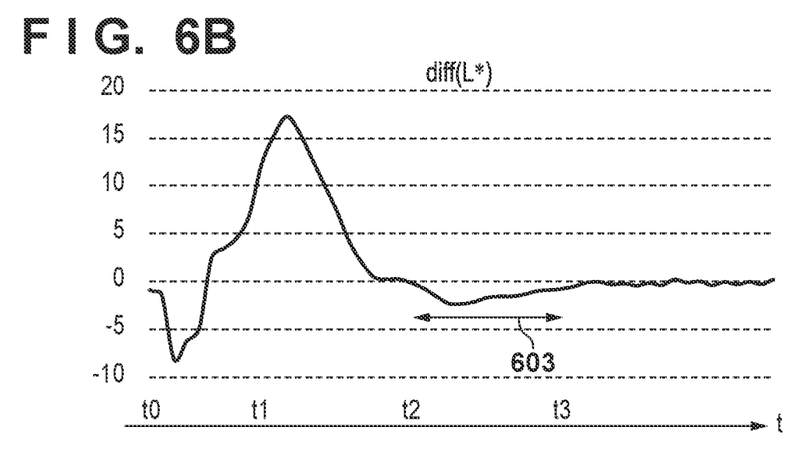
Figure 6C:
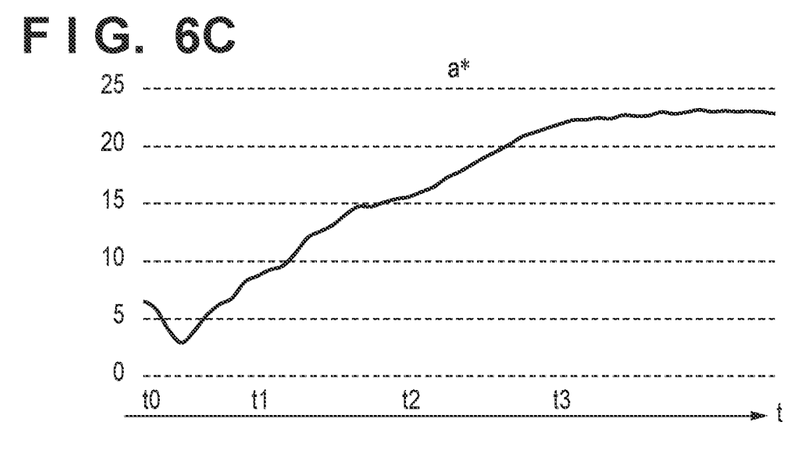

Next, the second embodiment will be described mainly regarding differences from the first embodiment. This embodiment uses the measurement apparatus 110 that is provided with the opening 205 shown in FIG. 2B. Note that the flowchart of measurement processing is the same as the first embodiment. FIGS. 6A to 6C are diagrams illustrating measurement timing determination processing according to this embodiment. Note that the meanings of the times t0, t1, and t2 are the same as those of the first embodiment. FIG. 6C shows a temporal change in the chromaticity a*. With the measurement apparatus 110 that is provided with the opening portion 205, blood moves toward the measurement region 210, and thus the color of the measurement region 210 becomes darker or red, as mentioned above. For this reason, the chromaticity a* increases monotonously, as shown in FIG. 6C. Accordingly, the measurement timing cannot be determined based on the temporal change in the chromaticity a*. That is to say, the chromaticity a* cannot be used as the determination information.

In this embodiment, the lightness L* is used as the determination information. FIG. 6A shows a temporal change in the lightness L*. As shown in FIG. 6A, the lightness L* significantly changes from the time t1 to the time t2 due to the influence of the housing of the measurement apparatus 110 brought into contact with the skin 200. Then, the lightness L* decreases exponentially from the time t2. Accordingly, the measurement timing is determined by determining the time t2 at which the lightness L* begins to decrease exponentially.

For this reason, in this embodiment as well, the control unit 111 obtains diff(L*), similarly to the first embodiment. FIG. 6B shows a temporal change in diff(L*). As shown in FIG. 6B, diff(L*) continues to take a negative value in a period 603 during which the lightness L* decreases exponentially. The control unit 111 searches for a time zone during which diff(L*) continues to take a negative value for a predetermined period or more, and determines the start time of the time zone found as a result of the search, as the measurement timing.

As described above, the manner in which the color of the skin 200 changes due to the measurement apparatus 110 being brought into contact with the skin 200 differs depending on the mode of the measurement apparatus 110. However, an appropriate measurement timing can be determined using appropriate determination information according to the mode of the measurement apparatus 110.

Third Embodiment

Figure 2C:
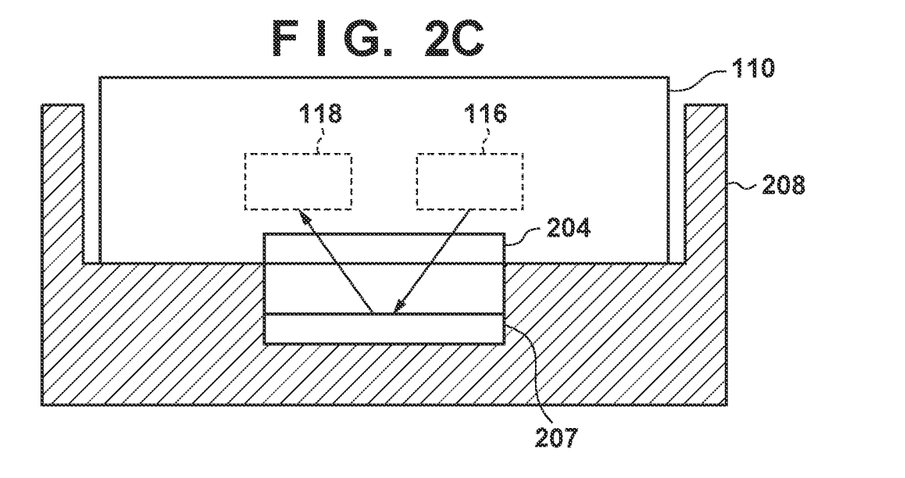
FIG. 2C shows calibration of the measurement apparatus.

Next, the third embodiment will be described, mainly regarding differences from the first embodiment and the second embodiment. FIG. 2C shows a state where the measurement apparatus 110 is calibrated. For example, a case 208 of the measurement apparatus 110 is provided with a white reference plate 207. Note that the white reference plate 207 is provide such that, when the measurement apparatus 110 is accommodated in the case, the white reference plate 207 is irradiated with light emitted by the light source 116, and the reflected light therefrom is incident on the dispersion unit 118. For example, upon receiving an instruction to start measurement as a result of a user operation, the control unit 111 first performs calibration, and measures skin color after completing the calibration. Note that the calibration is performed by causing the light source 116 to emit light and using a known method based on the result of receiving the reflected light from the white reference plate 207.

Figure 7:
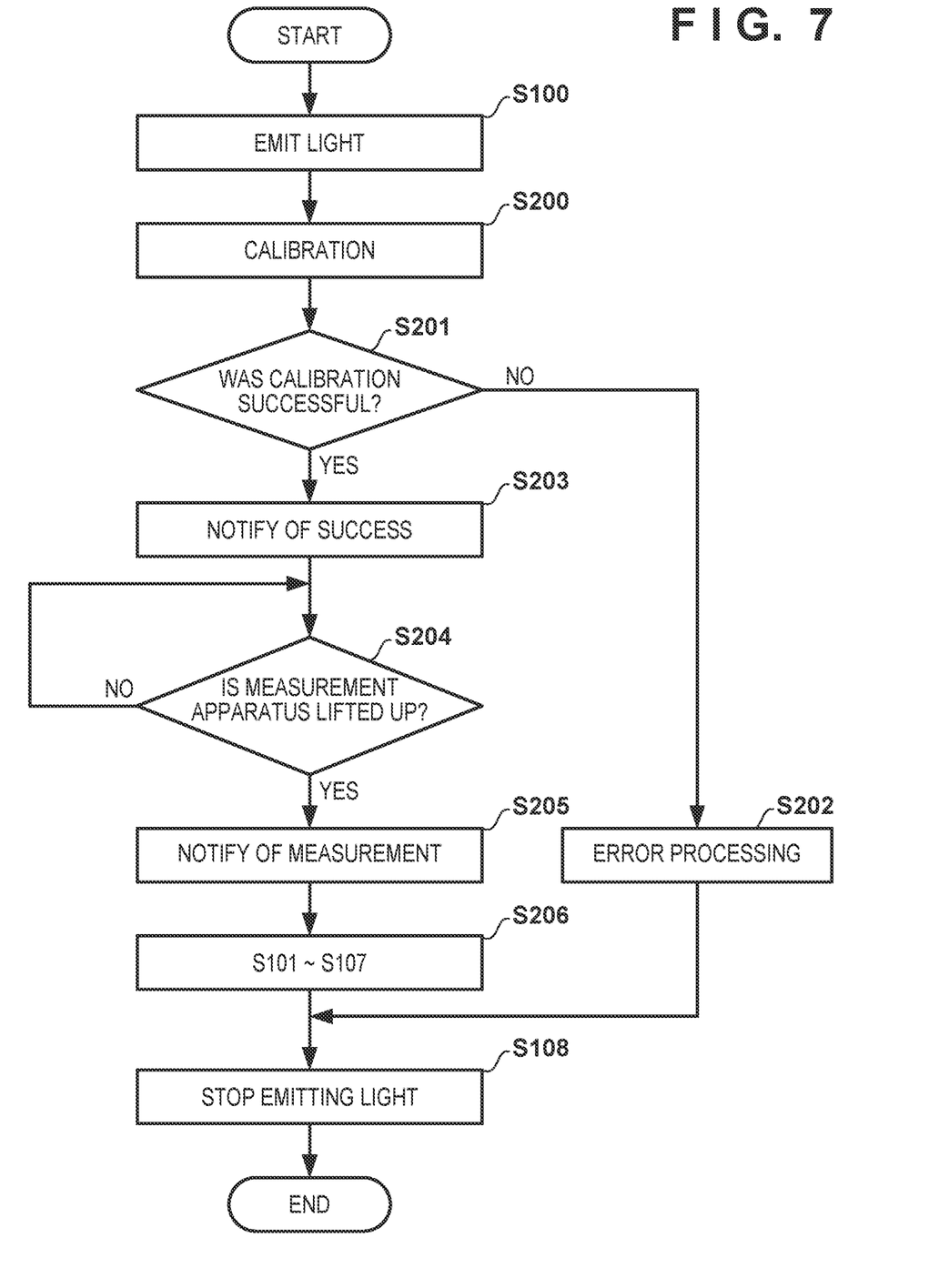
FIG. 7 is a flowchart of skin color measurement processing according to an embodiment.

FIG. 7 is a flowchart of skin color measurement processing according to this embodiment. Note that the same processing steps as those in the flowchart described with reference to FIG. 4 are assigned the same step numbers, and a description thereof is omitted. After causing the light source 116 to emit light in step S100, in step S200, the control unit 111 performs calibration as shown in FIG. 2C. In step S201, the control unit 111 determines whether or not the calibration was successful. For example, if the measurement apparatus 110 is not accommodated in the case 208, and the light-receiving device 119 does not receive reflected light, the control unit 111 can determine that the calibration has failed. Also, if the light-receiving device 119 has received reflected light but the amount of received light with the respective wavelengths is not within a predetermined range, the control unit 111 can determine that the calibration has failed. If it is determined that the calibration has failed, in step S202, the control unit 111 performs error processing. For example, the control unit 111 can notify the user that a calibration error has occurred, using the LED, the buzzer, or the like of the notification unit 114. Also, the control unit 111 can notify the operation terminal 130 that a calibration error has occurred. After the error processing, the control unit 111 causes the light source 116 to stop emitting light, and ends the processing in FIG. 7.

If it is determined that the calibration was successful, in step S203, the control unit 111 gives a notification indicating that the calibration was successful. For example, the control unit 111 can notify the user that the calibration was successful, using the LED, the buzzer, or the like of the notification unit 114, and can also notify the operation terminal 130 that the calibration was successful. Next, in step S204, the control unit 111 waits until the measurement apparatus 110 is lifted up. "Being lifted up" means that a user of the measurement apparatus 110 lifts up the measurement apparatus 110 to take it out of the case 208. If the control unit 111 detects that the amount of light with the respective wavelengths received by the light-receiving device 119 or the spectral reflectance at the respective wavelengths obtained based on the amount of received light has become smaller than a threshold, the control unit 111 can determine that the measurement apparatus 110 has been lifted up out of the case 208. Also, a configuration may be employed in which the measurement apparatus 110 is provided with a gyroscope (not shown), and it is detected that the measurement apparatus 110 has been lifted up out of the case 208 based on the result of output from the gyroscope. If the control unit 111 detects that the measurement apparatus 110 has been lifted up, in step S205, the control unit 111 notifies the operation terminal 130 that measurement is in progress. Then, in step S206, the control unit 111 performs steps S101 to S107 in FIG. 4, and in step S108, the control unit 111 causes the light source 116 to stop emitting light, and ends the processing in FIG. 7.

FIG. 8 shows example screens displayed on the display unit 134 of the operation terminal 130. FIG. 8A shows an example screen for notifying the user of the measurement apparatus 110 that the calibration is in progress, and this screen is displayed on the display unit 134 in step S200 in FIG. 7. FIG. 8B shows an example screen for notifying the user of the measurement apparatus 110 that a calibration error has occurred, and this screen is displayed on the display unit 134 in step S202. FIG. 8C shows an example screen for notifying the user of the measurement apparatus 110 that that the calibration was successful, and this screen is displayed on the display unit 134 in step S203.

Figure 8A:
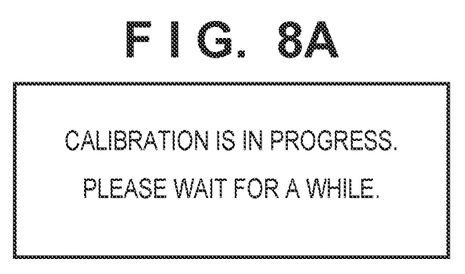
FIGS. 8A to 8G show example display screens.
Figure 8B:
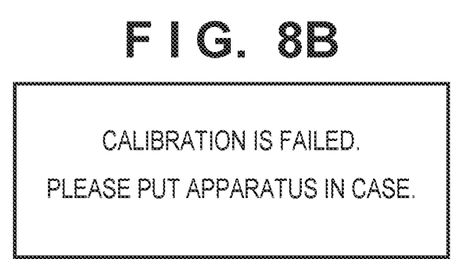
Figure 8C:
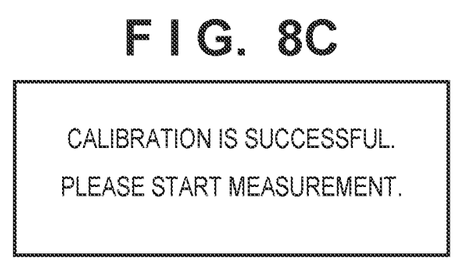
Figure 8D:
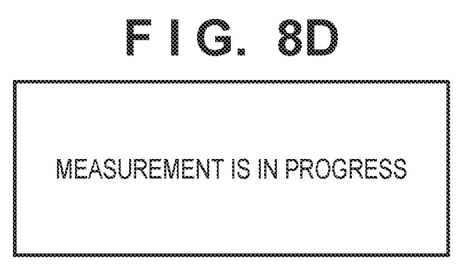
Figure 8E:
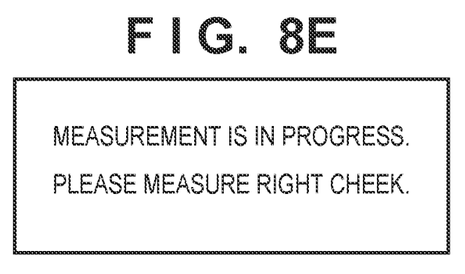
Figure 8F:
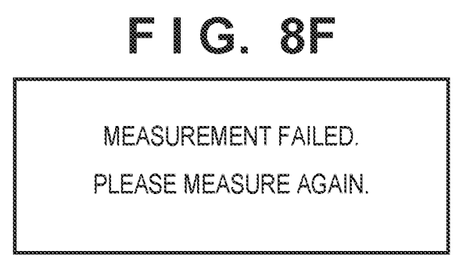
Figure 8G:
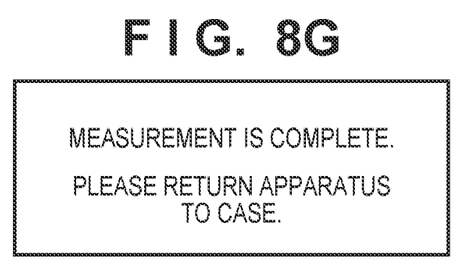

FIG. 8D shows an example screen for notifying the user of the measurement apparatus 110 that the measurement is in progress, and this screen is displayed on the display unit 134 in step S205 in FIG. 7 and while steps S101 to S104 and S106 in FIG. 4 are repeatedly performed. FIG. 8E shows another example screen for notifying the user of the measurement apparatus 110 that the measurement is in progress, and this screen also notifies the user of the measurement region. Note that, if measurement is performed at a plurality of portions, a configuration may be employed in which measurement regions are displayed in order. FIG. 8F shows an example screen for notifying the user of the measurement apparatus 110 of a measurement error, and this screen is displayed on the display unit 134 in step S107 in FIG. 4. FIG. 8G shows an example screen for notifying the user of the measurement apparatus 110 that the measurement is complete, and this screen is displayed on the display unit 134 in step S105.

As described above, the measurement apparatus 110 detects which of a series of measurement states the measurement apparatus 110 is in, based on the results of the light-receiving device 119 receiving light. The control unit 110 notifies the user of the detected state directly or via the operation terminal 130. Thus, the user can readily use the measurement apparatus 110.

Other Embodiments

Note that, in the first and second embodiments, the chromaticity a* and the lightness L* are used as the determination information. However, any kind of information that enables a color change due to movement of blood to be determined can be used as the determination information. For example, light with a wavelength in a range from 540 to 580 nm is absorbed by hemoglobin contained in the blood. Accordingly, the spectral reflectance and the amount of received light with respective wavelengths in the wavelength range from 540 to 580 nm, or the spectral reflectance and the amount of received light with a predetermined wavelength in the wavelength range from 540 to 580 nm may be used as the determination information, and the time at which these values begin to change in accordance with a predetermined pattern may be used as the measurement timing.

In the first and second embodiments, the measurement timing is determined based on a difference between the time t and the time (t−3), that is, a difference from the measurement result obtained in the third round prior to a certain round of the repetition of steps S101 to S106 in FIG. 4. However, the two measurement results between which a difference is obtained may be any other values. Furthermore, a configuration may alternatively be employed in which the measurement timing is determined based on a temporal change itself in the determination information, rather than by obtaining a difference. For example, change information indicating a change pattern of the determination information according to a change in the skin color due to movement of blood is obtained and stored in the storage unit 112. Then, time-series data of the measured determination information in respective time zones is compared with the change pattern indicated by the change information, and the start timing of the time zone in which the time-series data is most similar to the change pattern may be determined as the measurement timing.

In the above embodiments, the color information is the color values of the lightness L*, the chromaticity a*, and the chromaticity b* in the L*a*b* color space, but the color information may alternatively be color values in any other kind of color space. Furthermore, the spectral reflectance at respective wavelengths may also be used as the color information. Note that the color information and the determination information may be different pieces of information, or may be redundant pieces of information. For example, in the first and second embodiments, the determination information is the lightness L* and the chromaticity a*, and the color information is the lightness L*, the chromaticity a*, and the chromaticity b*. That is to say, in the first and second embodiments, the color information and the determination information are redundant pieces of information, or more specifically, the determination information is a part of the color information. However, a configuration is possible in which the lightness L* and the chromaticity a* are used as the determination information, and the spectral reflectance is used as the color information. In this case, the color information and the determination information are different pieces of information. Furthermore, a configuration is possible in which the spectral reflectance and the amount of received light at a predetermined wavelength are used as the determination information, and the lightness L*, the chromaticity a*, and the chromaticity b* are used as the color information. In this case as well, the color information and the determination information are different pieces of information. Furthermore, in the first and second embodiments, reflected light from the measurement region is received, but a configuration may alternatively be employed in which transmitted light that has passed through the measurement region is incident on the dispersion unit 118.

Embodiments of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-053477, filed on Mar. 20, 2019, which is hereby incorporated by reference herein in its entirety.

What is claimed is:

1. A measurement apparatus comprising:
a light source configured to irradiate a measurement region of skin whose color is to be measured with light;
a light receiving unit configured to receive reflected light from the measurement region or transmitted light that has passed through the measurement region;
an obtaining unit configured to repeatedly obtain determination information and color information relating to the color of the measurement region, based on a light-receiving result of the light receiving unit; and
a selection unit configured to select a first color information used to determine a color of the skin from the repeatedly-obtained color information, based on a temporal change in the determination information,
wherein the determination information is information obtained based on a difference between a first light-receiving result and a second light-receiving result of the light receiving unit.

2. The measurement apparatus according to claim 1, wherein the selection unit is further configured to determine, based on the temporal change in the determination information, a timing at which the measurement apparatus came into contact with the skin, and to select the first color information obtained at the determined timing by the obtaining unit.

3. The measurement apparatus according to claim 2, wherein the selection unit is further configured to store change information indicating a change pattern of the determination information that occurs due to the measurement apparatus being brought into contact with the skin, and to determine the timing at which the measurement apparatus came into contact with the skin by comparing the change information with the temporal change in the determination information.

4. The measurement apparatus according to claim 2, wherein the selection unit is further configured to determine the timing at which the measurement apparatus came into contact with the skin by determining a period in which the determination information changes exponentially.

5. The measurement apparatus according to claim 4, wherein the selection unit is further configured to determine a start timing of the period in which the determination information changes exponentially, as the timing at which the measurement apparatus came into contact with the skin.

6. The measurement apparatus according to claim 1, wherein the determination information is a part of the color information.

7. The measurement apparatus according to claim 1, wherein the color information is a spectral reflectance.

8. The measurement apparatus according to claim 1, wherein the color information is a color value in an L*a*b* color space.

9. The measurement apparatus according to claim 1, wherein the determination information is a spectral reflectance at a wavelength at which light is absorbed by hemoglobin, or in a wavelength range in which light is absorbed by hemoglobin.

10. The measurement apparatus according to claim 1, wherein the determination information is an amount of light received by the light receiving unit, the received light being in a wavelength range in which light is absorbed by hemoglobin.

11. The measurement apparatus according to claim 1, wherein the determination information is a chromaticity a* in an L*a*b* color space.

12. The measurement apparatus according to claim 11, further comprising
a light transmissive member that is to be brought into contact with the measurement region,
wherein the light source is further configured such that light from the light source passes through the light transmissive member and irradiates the measurement region.

13. The measurement apparatus according to claim 1, wherein the determination information is a lightness L* in an L*a*b* color space.

14. The measurement apparatus according to claim 13, wherein a housing of the measurement apparatus is provided with an opening corresponding to the measurement region, and
the measurement apparatus is used by bringing a region of the housing around the opening into contact with a periphery of the measurement region.

15. The measurement apparatus according to claim 1, further comprising
a notification unit configured to detect, based on the light-receiving result of the light receiving unit, which of a series of states relating to measurement of the color of the skin the measurement apparatus is in, and to notify a user of the measurement apparatus of the detected state.

16. The measurement apparatus according to claim 1, wherein the light receiving unit includes:
a dispersion unit configured to disperse the reflected light or the transmitted light according to wavelength; and
a plurality of light-receiving elements configured to receive light including different wavelengths dispersed by the dispersion unit.

17. The measurement apparatus according to claim 1, wherein the first light-receiving result is a result at a first timing, and the second light-receiving result is a result at a second timing after a predetermined time has elapsed from the first timing.

18. A non-transitory computer-readable storage medium that includes a program stored therein for a measurement apparatus that includes:
a light source configured to irradiate a measurement region of skin whose color is to be measured with light;
a light receiving unit configured to receive reflected light from the measurement region or transmitted light that has passed through the measurement region;
and one or more processors, the program, upon being executed by the one or more processors, causing the measurement apparatus to carry out:
repeatedly obtaining determination information and color information relating to the color of the measurement region, based on a light-receiving result of the light receiving unit; and
selecting a first color information used to determine a color of the skin from the repeatedly-obtained color information, based on a temporal change in the determination information,
wherein the determination information is information obtained based on a difference between a first light-receiving result and a second light-receiving result of the light receiving unit.

19. A measurement apparatus comprising:
a light source configured to irradiate a measurement region of skin whose color is to be measured with light;
a light receiving unit configured to receive reflected light from the measurement region or transmitted light that has passed through the measurement region; and
an obtaining unit configured to obtain, in a case where a difference value among a plurality of light-receiving results of the light receiving unit satisfies a predetermined condition, a light-receiving result satisfying the predetermined condition, from which the difference value satisfying the predetermined condition is obtained, as information used to determine a color of the skin.

20. The measurement apparatus according to claim 19, wherein the obtaining unit is further configured to determine a timing at which the measurement apparatus came into contact with the skin based on whether or not each difference value of a plurality of difference values of the light-receiving results satisfies the predetermined condition, and to obtain a light-receiving result at the determined timing as the light-receiving result satisfying the predetermined condition.

21. The measurement apparatus according to claim 20, wherein the obtaining unit is further configured to store change information indicating a change pattern of difference values of the light-receiving results that occurs due to the measurement apparatus being brought into contact with the skin, and to determine the timing at which the measurement apparatus came into contact with the skin by comparing the change information with the plurality of difference values of the light-receiving results.

22. The measurement apparatus according to claim 20, wherein the obtaining unit is further configured to determine the timing at which the measurement apparatus came into contact with the skin by determining a period in which the plurality of difference values of the light-receiving results changes exponentially.

23. The measurement apparatus according to claim 22, wherein the obtaining unit is further configured to determine a start timing of the period in which the plurality of difference values of the light-receiving results changes exponentially, as the timing at which the measurement apparatus came into contact with the skin.

24. The measurement apparatus according to claim 19, wherein the light-receiving results are spectral reflectance.

25. The measurement apparatus according to claim 19, wherein each difference value of a plurality of difference values of the light-receiving results is a difference value of chromaticity a* in an L*a*b* color space or a difference value of lightness L* in an L*a*b* color space.

26. The measurement apparatus according to claim 19, further comprising
a notification unit configured to detect, based on the light-receiving results of the light receiving unit, which of a series of states relating to measurement of the color of the skin the measurement apparatus is in, and to notify a user of the measurement apparatus of the detected state.

27. The measurement apparatus according to claim 19, wherein the light receiving unit includes:
a dispersion unit configured to disperse the reflected light or the transmitted light according to wavelength; and
a plurality of light-receiving elements configured to receive light including different wavelengths dispersed by the dispersion unit.

* * * * *